(12) United States Patent
Yin et al.

(10) Patent No.: US 8,697,448 B2
(45) Date of Patent: Apr. 15, 2014

(54) METHOD AND APPARATUS FOR IMPLEMENTING USER PERSONALIZED OPERATION OF CHEMISTRY ANALYZER

(75) Inventors: Yandong Yin, Shenzhen (CN); Yun He, Shenzhen (CN); Weizhong Di, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1427 days.

(21) Appl. No.: 11/875,405

(22) Filed: Oct. 19, 2007

(65) Prior Publication Data

US 2008/0263047 A1 Oct. 23, 2008

(30) Foreign Application Priority Data

Dec. 28, 2006 (CN) .......................... 2006 1 0064572

(51) Int. Cl.
*G06F 17/30* (2006.01)
(52) U.S. Cl.
USPC .......... 436/43; 422/63; 422/67; 707/999.009; 707/999.202; 707/E17.003; 707/E17.059
(58) Field of Classification Search
None
See application file for complete search history.

(56) References Cited

U.S. PATENT DOCUMENTS

2007/0233303 A1* 10/2007 Naito ........................... 700/108

FOREIGN PATENT DOCUMENTS

| CN | 1805359 A | 7/2006 |
|---|---|---|
| CN | 1908671 | 2/2007 |
| CN | 1908671 A | 2/2007 |
| JP | 1994148197 | 5/1994 |
| JP | 8-41033 | 2/1996 |
| JP | 2000-112605 | 4/2000 |
| JP | 2000112605 | 4/2000 |
| WO | WO 00/47540 | 8/2000 |
| WO | WO0047540 | 8/2000 |

OTHER PUBLICATIONS

English translation of abstract for Chinese Patent Publication No. CN1908671.
English translation of abstract for Japanese Patent Publication No. JP2000112605.
English translation of abstract for Japanese Patent Application No. JP1994148197.
Dassen, J. H. M., "Dynamic Loading", Aug. 1, 1995, 5 pages.
Engelschall, Ralf S., "Apache 1.3 Dynamic Shared Object (DSO) Support", Apr. 1998, 6 pages.
Dynamic Library Programming Topics: Introduction, 2 pages.
Dynamic Library Programming Topics: General, dated Feb. 26, 2009, 86 pages.

* cited by examiner

*Primary Examiner* — P. Kathryn Wright
(74) *Attorney, Agent, or Firm* — Kory D. Christensen; Stoel Rives LLP

(57) ABSTRACT

The present invention discloses a user personalized operating method and operating apparatus for use in a chemistry analyzer, the method comprises following steps: initiating the operating software of the chemistry analyzer; loading a profile, the profile comprising at least a database containing combinations of controls for respective users; retrieving configuration information of the function components from the database; and setting display interface and function components by the chemistry analyzer according to the configuration information. The present invention realizes different combinations of controls and display interface by use of the profile and thus operating software of different versions can be provided.

9 Claims, 9 Drawing Sheets

Fig. 5

Sample Information

| No. | 1 | Position | 1 | Sample Type | Blood serum | ☐ Emergecny |
|---|---|---|---|---|---|---|
| Sample cup | Standard | | | State of Sample | Standard | ☐ Blank |
| Times | 1 | Barcode | | | | |

Assays of application

| ALT | DBIL | TP | ALB | CHO |
|---|---|---|---|---|
| HDL-C | AST | LDH | Urea | Crea |
| UA | CK | r-GT | Apo-A1 | Apo-B |
| Lp(a) | LD-1 | MALB | ALP | B-AMS |
| U-AMS | TBA | CHE | ADA | B2-MG |
| K | Na | Cl | Li | SI |

Combination

Sample Application List

Sample Disk No. 1

| No. | Position | Status |
|---|---|---|
| #1 | | To be applied |

| Sample Information | | |
|---|---|---|
| Sample Information | | |
| Sample No. | 1 | Barcode |
| Sample Type | | No. of Blood Bag |
| State of sample | | Sender | Examiner |
| Time of sending for examination | 2006-12-20 | 10:07:17 | Examination time |

☐ Information of Donator

Verifier | | Verification Conclusion

| Default Seting | Obtain Default | Save | |< | < | > | >| |
|---|---|---|---|---|---|---|
| | | | Cancel | | | Off |

Fig. 7

Sample Information

Sample Information

| Sample No. | 1 | Barcode | |
|---|---|---|---|
| Sample Type | | Sent By | Sender |
| State of sample | | Tested by | Examiner |
| Time of sending for examination | 2006-12-20 | 10:14:34 | Examination time |

☐ Information of Patient

| Default Seting | Obtain Default | |<  | <  | >  | >| |
|---|---|---|---|---|---|
| | Save | Cancel | | | Off |

Fig. 8

Sample Information

Sample Information

Sample No.     1          Barcode

Sample Type               Examiner            Sender

State of sample           Examination time    2006-12-20    10:14:34

☐ Subject Information

Verifier

Verification
Conclusion

Default Seting    Obtain Default    Save    |<    <    >    >|    Cancel    Off

Fig. 9

METHOD AND APPARATUS FOR IMPLEMENTING USER PERSONALIZED OPERATION OF CHEMISTRY ANALYZER

CROSS REFERENCE TO RELATED APPLICATION(S)

The instant Application claims priority of China Patent Application No. CN2006 10064572, entitled "METHOD AND APPARATUS FOR IMPLEMENTING USER PERSONALIZED OPERATION OF CHEMISTRY ANALYZER" and filed on Dec. 28, 2006.

TECHNICAL FIELD

The present invention relates to a Chemistry analyzer in the medical field and, in particular, to a Chemistry analyzer capable of changing operating functions and display interfaces based on different users.

BACKGROUND ART

Fully automatic Chemistry analyzers are used by various users, both usage conditions and application modes of the analyzer are different for different users. Most users of the analyzer are the examination clinic, emergency clinic, health examination centre and blood bank. Different users have different requirements on the function components and display interfaces of the operating software of the analyser, as well as the operation processes. For example, the number of a blood bag is necessary to the blood bank, but it is absolutely unnecessary to the examination clinic in a hospital. Further, when the blood bank using the analyzer, the assays of each application are basically consistent, and thus can be further automatized by setting applications inside the software.

However, the operating software of the analyzer in the prior art is the same software for different users, and the operation software is not customized in terms of controls for different users. In particular, the man-machine interaction interface of the analyzer is not provided with different configuration for different users, operating processes are not designed based on different users. Thus the following problems are caused: some functions or display interfaces may be substantially unnecessary to certain users and can not be hidden; on the contrary, some functions and display interfaces specific to the user are neglected, and thus can only be perfected by updating or upgrading the software. Thus the user's requirement can not be satisfied timely and efficiently when it varies.

SUMMARY OF THE INVENTION

One object of the present invention is to provide a biochemical analyzer capable of performing personalized operations such that the Chemistry analyzer may provide different display interfaces and function components for different users.

In order to realize the mentioned object, according to one aspect of the present invention, there's provided a method of implementing user personalized operation of Chemistry analyzer, the method comprising steps of: A) initiating an operating software of the Chemistry analyzer; B) loading a profile, said profile including at least a database containing combinations of controls, wherein the controls include configuration information relating to function components, operation interfaces of respective users; C) retrieving configuration information of the controls from said database; and D) setting display interface and function components based on said loaded configuration information by said Chemistry analyzer.

According to another aspect of the present invention, there's provided an operating apparatus used in a Chemistry analyzer, comprising: a memory for storing operating software; a processor for executing said operating software and loading a profile, wherein said profile comprises at least a database containing combinations of controls, wherein the controls include configuration information relating to function components, operation interfaces of respective users; an information retrieving unit for retrieving configuration information of the controls from the database; and a setting unit for setting display interface and function components based on the configuration information.

The advantageous effects of the present invention include:
1) The present invention allows different users to flexibly configure their function components and display interface as well as to hide unused functions or to display special functions required by specific users by means of different profiles, on the basis of the same biochemical analyzing function software. Therefore, different function component combination and different display interfaces can be obtained by selecting various versions, while the software design and its code are not necessarily modified. Since different versions have their different function components and interface, different versions also have different operation processes.
2) The control database can be modified only by those authorized personnel in order to guarantee database.
3) The database is saved in the form of resource file to further guarantee the safety of the database.

The features and advantages of the present invention will be descried in detail in the following embodiments with reference to the accompanying drawings.

DESCRIPTION OF DRAWINGS

FIG. 5 is a diagram showing the sample application interface of the blood bank;

FIG. 6 is a diagram showing the sample application interface of the clinic version;

FIG. 7 is a diagram showing the detailed sample information interface of the blood bank;

FIG. 8 is a diagram showing the detailed sample information interface of the clinic version; and FIG. 9 is a diagram showing the detailed sample information interface of the health examination center version.

PREFERRED EMBODIMENTS

A fully automatic Chemistry analyzer is usually a fully automatic clinical chemical examination instrument controlled by a computer, which is used for quantization analysis of the biochemical assays such as the samples of blood serum, blood plasma, urine, cerebrospinal fluid etc. Most users of the automatic Chemistry analyzer usually comprise blood banks, health examination centers, clinical laboratories, as well as other reagent examination departments. For different users, the functions and operation processes differ from each other.

For example, the number of assays for the blood banks is relatively less, but the required quantity of the reagents for a certain singe assay is relatively large. For example, one or more bottles of reagents shall be placed in all reagent plates, and when one bottle of reagent is exhausted during the examination procedure, other reagent bottles shall be used automatically. However, for the clinical laboratory, the number of assays is relatively large, but it is usually unnecessary to accommodate many reagent bottles for a single assay.

Figure 1:
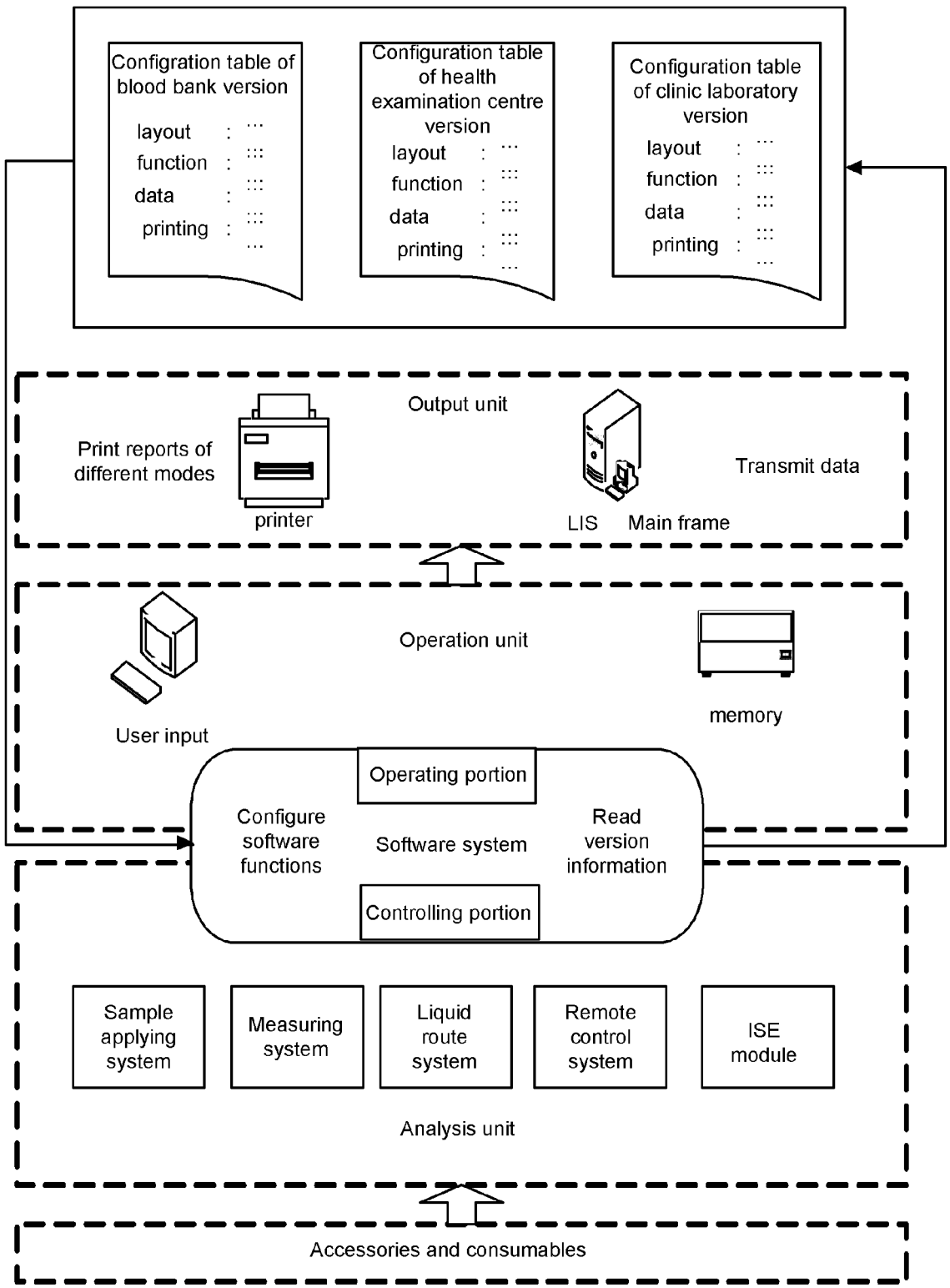
FIG. 1 is a diagram showing the system structure of a Chemistry analyzer.

A Chemistry analyzer with different combinations of function components, operation specifications and display interfaces (which are as a whole, referred as controls) are provided to different classes users in this embodiment. The structure of the Chemistry analyzer is shown in FIG. 1, the analyzer comprising an analyzing unit, an operation unit (e.g., PC), an output unit (such as a printer), accessories and consumables. The operation unit and the analysis unit are the kernel of the Chemistry analyzer. The analysis unit is usually an external instrument for performing biochemical analysis, and the operation unit is usually a personal computer equipped with operating software for executing control and analysis functions, which is connected to the analysis unit through a serial port, to the LIS Host through network (TCP/IP), and to the printer through a USB or parallel port. The operation unit accepts inputs by the user and controls the analyzer to perform examination operation, and outputs the examination results. The present invention relates to the improvement of the operation unit.

According to the present invention, based on an investigation into the common functions and special functions needed by the various users of Chemistry analyzers, all of the possible and potential functions that can be or will be used by the various users are divided into common functions and special functions. In one hand, the operating software in the operation unit can realize all the known and evaluated common functions and special functions and display contents/interfaces as in the prior art; in another hand, it does not constantly provide and display all the functions and contents to various users, instead, requirements of different users are satisfied respectively by means of a profile for configuring display contents and functions necessary for the different users. By modifying the profile, different versions of operation software can be created.

Figure 2:
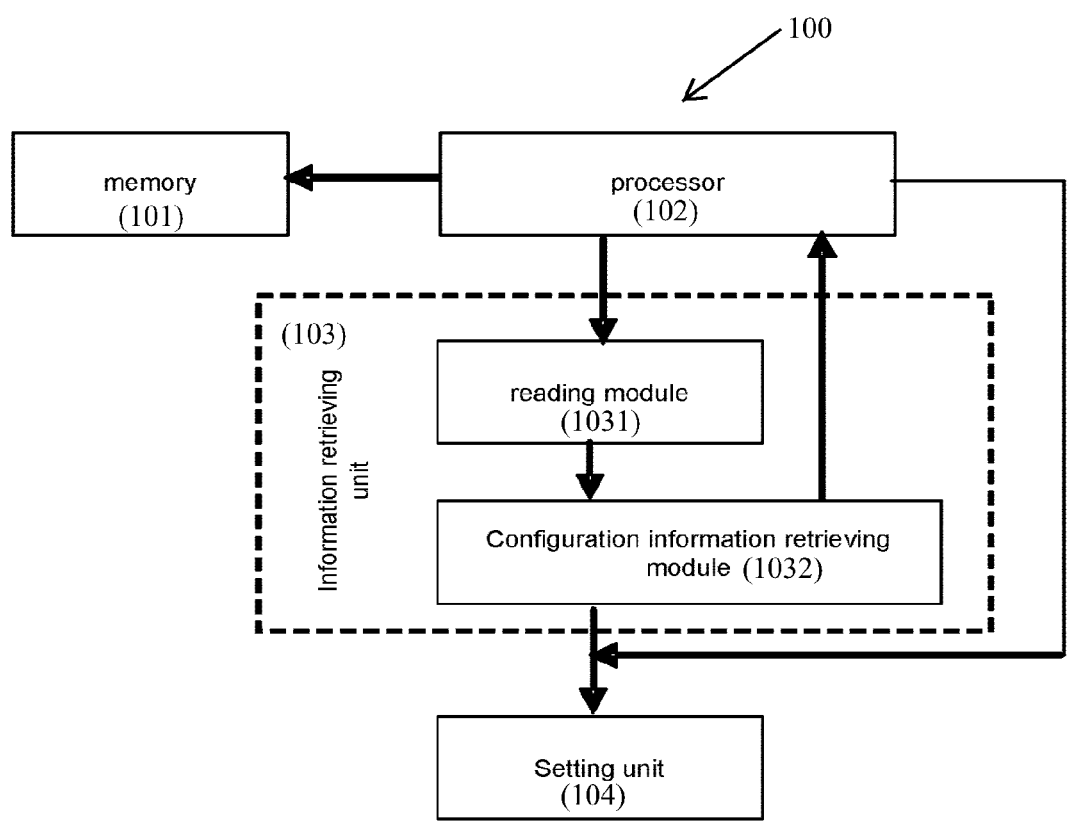
FIG. 2 is a block diagram showing an embodiment of the present invention.

FIG. 2 is a schematic diagram showing the operation unit 100 according to an embodiment of the present invention. The operation unit 100 comprises: a memory 101 for storing an operating software and a profile, wherein, in addition to the common functions, said profile further includes at least a database containing combinations of controls corresponding to specific users. Said database is used to save configurations specific to different users, comprising at least all or partial special functions required by one or more users; a processor 102 for executing the operating software and loading the profile; an information retrieving unit 103 for retrieving configuration information corresponding to the controls from the loaded database, wherein, said processor can further load related resources according to said retrieved configuration information; and a setting unit 104 for setting display interface and function components based on the loaded configuration information and resources.

According to this embodiment, the control database may be a single profile or a part of the profile. Said database may comprise a file header and a body. Said file header comprises version information corresponding to various users, for example, the version information in the file header may be set to the blood bank version. Said body comprise configuration information of each item of the controls defined by one or more versions, thus the configuration information corresponding to a certain version can by found based on the version information. In this embodiment, the body may be in a form of a two-dimensional registration table with an X direction and a Y direction, wherein one or more versions are set in the X direction and the combinations of controls are in the Y direction, thereby each function item of the controls has a respective version information, as shown in table 1 in which most items are listed for three versions. Here, the operating software has three commercial versions, that is, a clinic version, a blood bank version, and a health examination centre version. The combinations of controls include layout, functions, display information and printing.

Registration Table 1

| class | detailed item | blood bank version | health examination centre version | clinic version |
|---|---|---|---|---|
| layout | description of the differences of layouts among commercial versions, mainly defining window layout | | | |
| | background color | light red | light green | light grey |
| | default interface after initiation | sample application | graphic indication | information notification |
| function | describing special functions and preferred functions of each version | | | |
| | preset array | ALT/ALT1 | all | all |
| | default application | ALT/ALT1 | none | none |
| | automatic application during scanning samples | default | none | none |
| | No. of repeated tests | 2 in default | 1 in default | 1 in default |
| | observing mode of results by default | observing based on assays | observing based on samples | observing based on samples |
| | reagent setting | multiple positions for once assay | mixed | mixed |
| | fast emergency treatment | no default setting | no default setting | default setting |

-continued

Registration Table 1

| class | detailed item | blood bank version | health examination centre version | clinic version |
|---|---|---|---|---|
| | default calibration settings | ALT/ALT1 two points calibration, selecting CALIB1/and CALIB2 calibration fluids | none | none |
| | automatic calibration | calibration at turning on | none | none |
| | automatic QC | once per day by default | none | none |
| | automatic dilution calibration | hidden | display | display |
| | cost statistics | hidden | display | display |
| | workload statistics | hidden | hidden | display |
| information | special display data information required by different versions | | | |
| | no. of blood bag | exist | none | none |
| | clinic, doctor, class of patient, charging items, no. of medical record, treatment clinic, doctor in charge, clinic area, account of medical insurance, clinical diagnosis | none | none | exist |
| printing | mode of default printing report, and default settings of automatic printing | | | |
| | report mode | assays collection | reports collection | patient report |
| | automatic printing | no | yes | no |

In this embodiment, the information retrieving unit 103 further comprises: a reading module 1031 for reading out the version information in the file header of the database; a configuration information retrieving module 1032 for retrieving the configuration information of each item of the controls defined by the retrieved version information from the body of the database based on the version information read by the reading module, and supplying said retrieved configuration information to the setting unit 104.

In order to guarantee dynamic configuration, the present invention has all the resources (inducing pictures, characters, multimedia resources, etc,) dynamically loaded. When the operating software is initiated, the profile is checked first, then resources for the corresponding version are loaded and the contents and functions to be displayed are determined by the processor according to the configuration information contained in the profile.

In order to facilitate upgrading, the profile is compiled separately as a resource file (here, a resource file refers to a file saving external information or data necessary for the software, similar to pictures, character strings etc). For example, it can be compiled into a language library file, without being incorporated into the executable files of the operating software. Multiple-language extensions will be possible by separating the resource files from the executable files. The integration of the configuration information into the resource file is more advantageous to protect the configuration information, and can increase the read speed as compared to the traditional INI file mode.

It shall be noted here that the mentioned profile is not limited to be stored in the internal memory of the operation unit, it can also be saved in a remote server and can be downloaded into the operation unit via a network from the remote server while the operating software is initiated, thus the maintenance of the profile can be further facilitated.

In addition to complete the control database during the development stage, the file header and/or body can also be modified by those advanced users or developers when necessary, but the right of the users shall be authorized. If the users are not authorized, any modification of the file header and or body is prohibited. For this purpose, the operation unit 100 according to the present invention further comprises an information input unit (not shown in the drawings) for resetting the version information in said file header and/or resetting the configuration information of each item of the controls defined by that version in the body, based on the user's selection; and a right authorization unit not shown in the drawings) for authorizing the user's right before the version information of the file header and/or body is reset.

For example, the control database may be encrypted using XOR arithmetic, said configuration information is allowed to be modified only when a correct password is inputted. In addition, a maintenance and setting interface is provided in the operation unit, thereby advanced users and maintenance personnel may modify the file headers in the database and configure the commercial versions to be used. Further, the developers can modify the body of the database, as well as configure the controls of each version, display contents and operation process.

Figure 3:
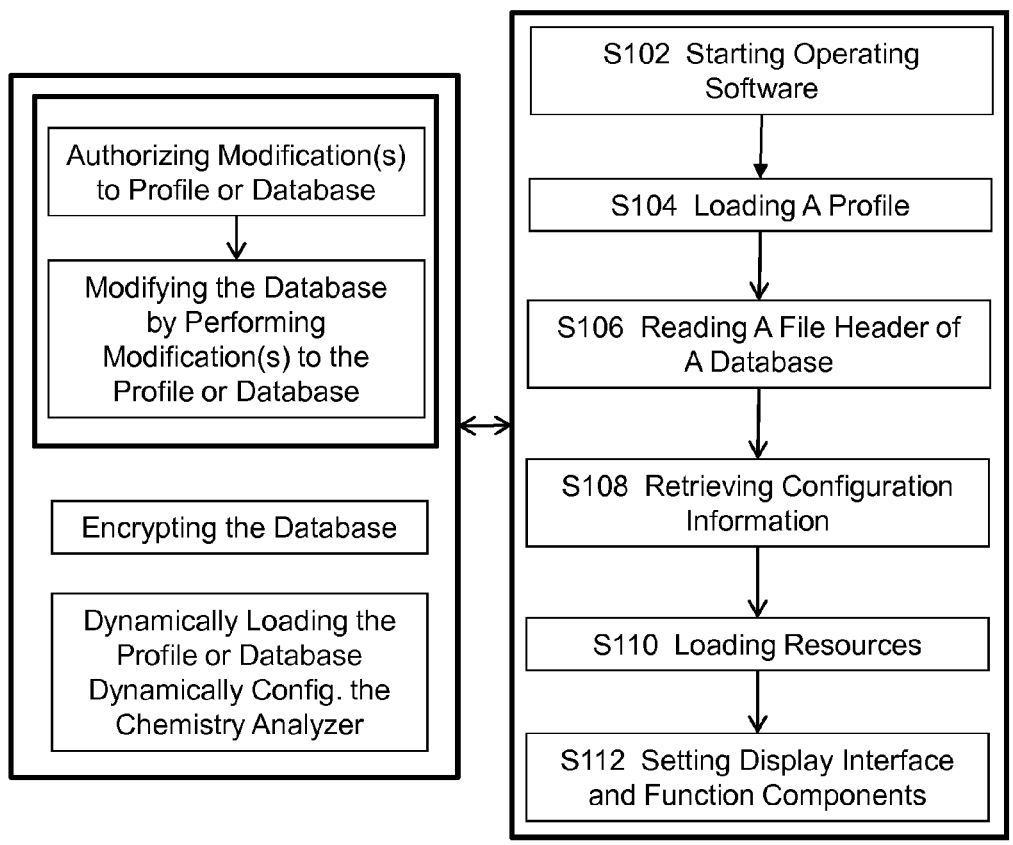
FIG. 3 is a diagram showing the flowchart of an embodiment of the present invention.

The following describes a personalized operating method of the Chemistry analyzer according to a preferred embodiment of the present invention with reference to FIG. 3.

Firstly, the system operating software is initiated in step S102, then the process proceeds to step S104;

A profile is loaded in step S104, said loaded profile comprises at least a database containing combinations of controls, wherein the controls include configuration information relating to function components, operation specifications and interfaces etc., then the process proceeds to step S106;

The version information in the file header is read out from the loaded database in step S106, then the process proceeds to step S108.

In step S108, the configuration information of each item of the controls corresponding to the version information read in step S106 is retrieved from the body of the database, then the process proceeds to step S110;

Resources of the corresponding version are loaded according to the configuration information in step S110, then the process proceeds to step S112; and The interface and function components adaptable to the user of the version are displayed by the Chemistry analyzer according to the configuration information in the loaded profile and the loaded resources in step S112.

Figure 4:
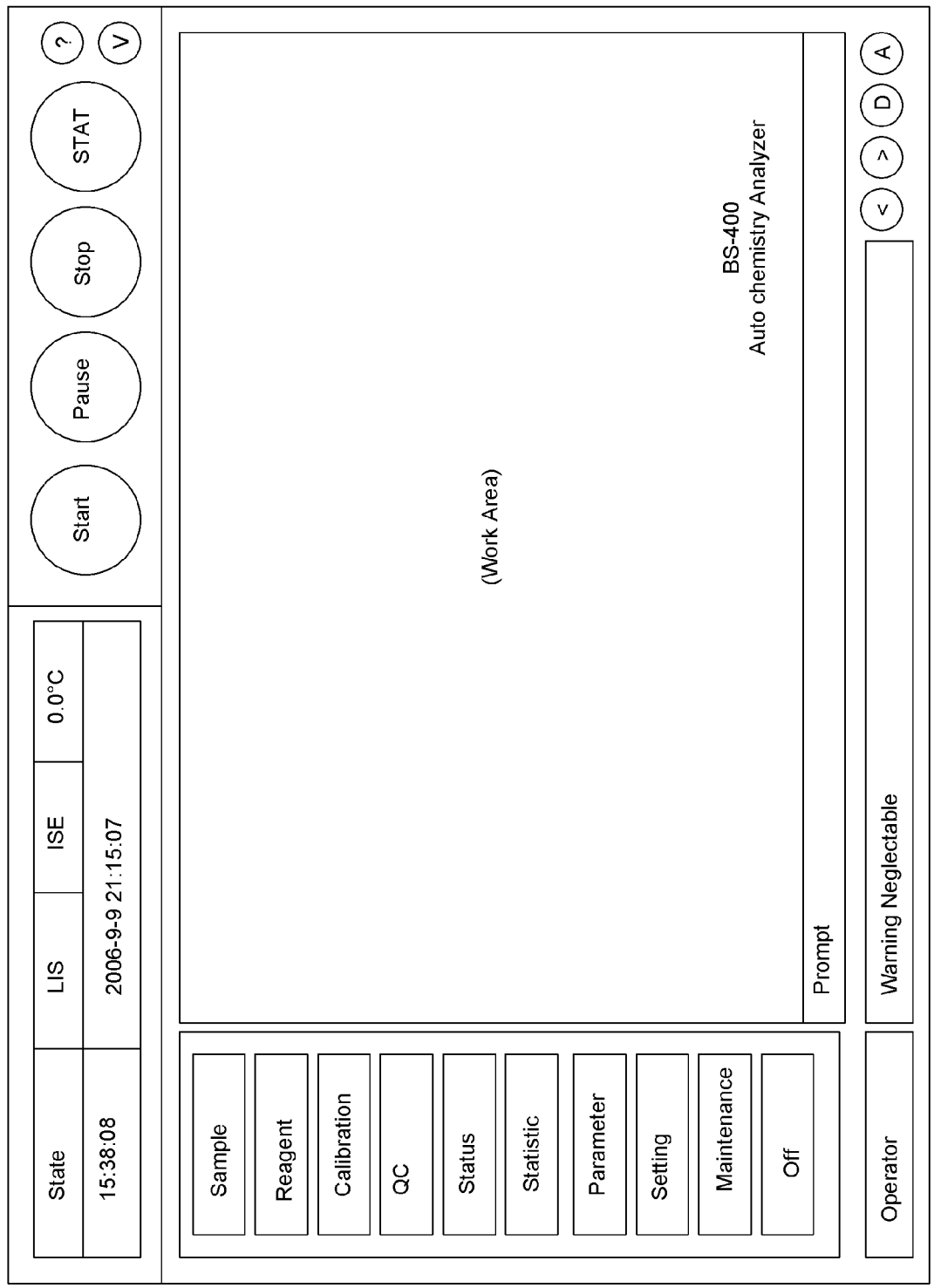
FIG. 4 is a diagram showing the main interface of the clinical version according to an embodiment of the present invention.
Figure 5:
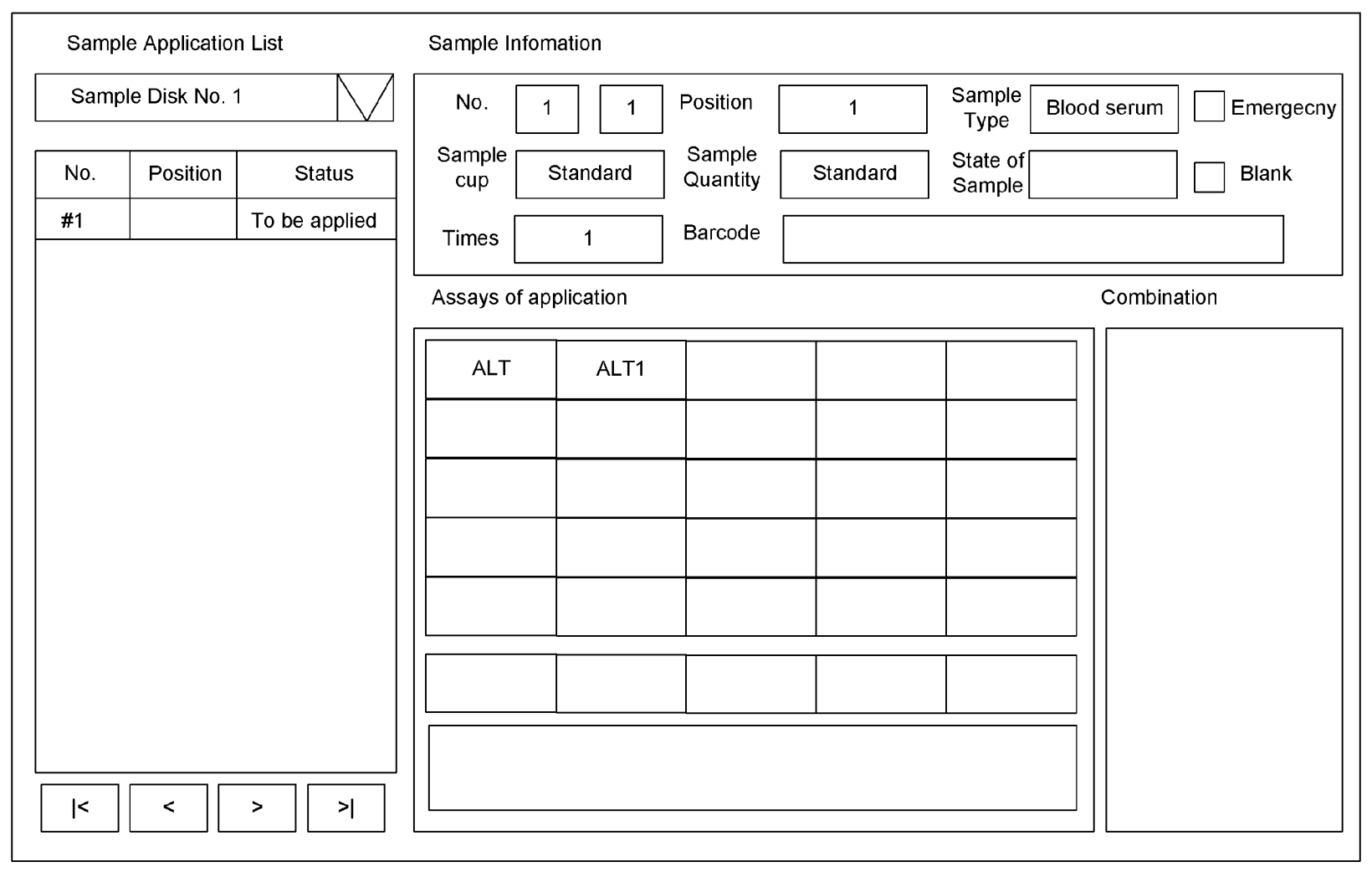

It is possible for the same function item in the control database to contain different configurations in different versions. For example, the layout includes a background color and a default interface after initiation, wherein, said clinic version has its background color set to a third color, for example light grey, and its default interface set to an information prompting interface, as shown in FIG. 4. The background color of said health examination centre version may be set to a second color, for example light green, and the default interface thereof after initiation may be set to a graphic indication interface. The background color of said blood bank version may be set to a first color, for example light red, and the default interface after initiation may be set to a sample application interface. The display interface is constituted based on each version in the profile. For example, if the "sample application" interface is entered by clicking the "sample" button, for the blood bank version, ALT and ALT1 are selected as the default assays, and other assays are hidden automatically, as shown in FIG. 5; while all the pre-inputted assays are displayed for the clinic version, and no assay at all will be selected by default, as shown in FIG. 6. Further, in the sample detail information window, the number of the blood bag is displayed for the blood bank version without any related information about the hospital, as shown in FIG. 7. However, there is no number of blood bags in the clinic version shown in FIG. 8, but the user is allowed to observe the related information of the hospital, while there is neither the number of blood bag in the health examination centre version shown in FIG. 9.

By setting different configuration information with respect to different versions in the control database, different versions may have different display interfaces and different combinations of controls in accordance with their requirements. Therefore, the operation can be personalized, and the optimal application performance of the analyzer can be maximized.

In addition, the present invention allows users have certain rights to modify the control database in the profile of the Chemistry analyzer. When a user modifies the database and hopes to make it become effective immediately, the present invention allows the user to activate and reload the modified database, thereby the display interface and/or function components are updated.

The present invention configures the function components and display interface of the operating software of the Chemistry analyzer by use of a profile in the form of registration table, and thus provides different versions for different users. Such a configuration in combination with the Chemistry analyzer software make it possible to provide an operation software with different functions and display interface and specific operation process adaptable to different users, and thus facilitate the usage of the analyzer by specific users.

What is claimed:

1. A machine implemented method of implementing individualized operations of a chemistry analyzer, comprising:
using at least one processor to initialize an operating software of the chemistry analyzer to perform a process, the process comprising:
loading a profile, the profile stored in memory of the chemistry analyzer or in a remote data server connected to the chemistry analyzer via a network and including at least a database stored in a resource file that is separated from executable files of the operating software comprising one or more combinations of controls, a header comprising version information for a plurality of respective users, and a storage portion comprising configuration information of each item of the one or more combinations of controls defined by one or more versions, wherein
the one or more combinations of controls include a layout, one or more functions, display information, printing, and configuration information that relates to one or more functional components which comprise at least one special function required by one or more of the plurality of respective users,
the layout comprises a background and a default interface after initialization for one or more versions, and
the one or more versions include:
a blood bank version comprising a first background color for the background and a sample application interface for the default interface after the initialization,
a health examination center version comprising a second background color for the background and a graphic indication interface for the default interface after the initialization, and
a clinic version comprising a third background color for the background and an information prompting interface for the default interface after the initialization;
retrieving configuration information of the one or more combinations of controls from the database, further comprising:
reading the version information in the header of the database, the version information comprising information for the blood bank version, the health examination center version, and the clinic version, and
retrieving the configuration information of the each item of the one or more combinations of controls based at least in part upon the version information, wherein the version information in the header and the configuration information of each item defined by its version are reset based at least in part upon a user's selection;
loading one or more resources pertaining to one of the plurality of respective users according to the configuration information of the profile, wherein a display interface and the one or more functional components are set according to the configuration information and the one or more resources;
verifying user's right when the version information of the header or the storage portion is reset by the user; and
setting a display interface of a plurality of display interfaces and the functional component of the one or more functional components based at least in part on the configuration information to analyze the one or more biochemical assays by operating the chemistry analyzer.

2. The machine implemented method of claim 1, further comprising:
identifying a plurality of versions including a first version of the operating software, in which the operating software remains identical and exhibits no differences for each of the plurality of versions.

3. The machine implemented method of claim 2, further comprising:
for the first version of the operating software, hiding a first functional component of the one or more functional components from a first user of the plurality of respective users based at least in part upon the profile.

4. The machine implemented method of claim 2, further comprising:
identifying a second version of the plurality of versions of the operating software, wherein the first version provides a different function or functional component that is not provided by the second version.

5. The machine implemented method of claim 4, further comprising:
for the second version of the operating software, providing a first functional component of the one or more functional components to a second user of the plurality of respective users based at least in part upon the profile.

6. The machine implemented method of claim 1, further comprising:
authorizing a modification to the profile or the database that comprises the one or more combinations of controls; and
modifying the database by performing the modification to the profile or the database.

7. The machine implemented method of claim 1, further comprising:
encrypting the profile or the database.

8. The machine implemented method of claim 1, further comprising:
dynamically loading the profile or the database for dynamically configuring the chemistry analyzer.

9. The machine implemented method of claim 1, further comprising: identifying the configuration information from the storage portion of the database by using at least the version information of the operating software from the header of the database structure.

* * * * *